(12) United States Patent
Bommer et al.

(10) Patent No.: US 8,499,631 B2
(45) Date of Patent: *Aug. 6, 2013

(54) NONDESTRUCTIVE INSPECTION OF AIRCRAFT STIFFENERS

(75) Inventors: Jason Philip Bommer, Tacoma, WA (US); Gary E. Georgeson, Federal Way, WA (US); Dennis M. Lewis, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 1440 days.

This patent is subject to a terminal disclaimer.

(21) Appl. No.: 12/032,613

(22) Filed: Feb. 15, 2008

(65) Prior Publication Data

US 2009/0205429 A1  Aug. 20, 2009

(51) Int. Cl.
*G01H 1/00* (2006.01)

(52) U.S. Cl.
USPC .......................................... 73/583; 356/480

(58) Field of Classification Search
USPC .. 73/634, 579, 583; 250/395, 336.1; 342/189; 356/480
See application file for complete search history.

(56) References Cited

U.S. PATENT DOCUMENTS

| | | | | |
|---|---|---|---|---|
| 2,491,418 A * | 12/1949 | Schlesman | | 72/31.07 |
| 2,630,472 A * | 3/1953 | McArthur | | 324/636 |
| 3,789,656 A * | 2/1974 | Miller | | 73/620 |
| 4,100,809 A * | 7/1978 | Bobrov et al. | | 73/638 |
| 4,907,888 A * | 3/1990 | Clarke et al. | | 356/613 |
| 5,170,666 A * | 12/1992 | Larsen | | 73/571 |
| 5,505,090 A * | 4/1996 | Webster | | 73/657 |
| 5,698,787 A * | 12/1997 | Parzuchowski et al. | | 73/643 |
| 6,595,061 B2 * | 7/2003 | Gorman et al. | | 73/597 |
| 6,605,807 B2 * | 8/2003 | Safai | | 250/341.1 |
| 7,205,956 B1 * | 4/2007 | Sychaleun et al. | | 343/890 |
| 7,236,625 B2 * | 6/2007 | Engelbart et al. | | 382/141 |
| 7,249,512 B2 * | 7/2007 | Kennedy et al. | | 73/618 |
| 7,277,822 B2 * | 10/2007 | Blemel | | 702/183 |
| 7,296,472 B2 * | 11/2007 | Cobb | | 73/579 |
| 7,312,454 B2 * | 12/2007 | Safai et al. | | 250/347 |
| 7,325,771 B2 * | 2/2008 | Stulc et al. | | 244/119 |
| 7,554,339 B2 * | 6/2009 | Horton et al. | | 324/627 |
| 7,562,576 B2 * | 7/2009 | Fetzer et al. | | 73/614 |
| 7,830,523 B2 * | 11/2010 | Bommer et al. | | 356/450 |
| 2002/0088281 A1 * | 7/2002 | Gorman et al. | | 73/579 |
| 2003/0191564 A1 * | 10/2003 | Haugse et al. | | 701/29 |
| 2006/0004499 A1 * | 1/2006 | Trego et al. | | 701/29 |
| 2006/0010980 A9 * | 1/2006 | Bossi et al. | | 73/620 |
| 2006/0043303 A1 * | 3/2006 | Safai et al. | | 250/347 |
| 2006/0069520 A1 * | 3/2006 | Gorinevsky et al. | | 702/36 |
| 2006/0162456 A1 * | 7/2006 | Kennedy et al. | | 73/620 |
| 2007/0046298 A1 * | 3/2007 | Safai et al. | | 324/639 |
| 2007/0069720 A1 * | 3/2007 | Goldfine et al. | | 324/240 |

(Continued)

OTHER PUBLICATIONS

Hill et a;., "Aperture Excitation of Electrically Large, Lossy Cavities", IEEE Trans. On Electromagnetic Compatibility, vol. 36, No. 3, Aug. 1994.

(Continued)

*Primary Examiner* — Peter Macchiarolo
*Assistant Examiner* — Samir M Shah
(74) *Attorney, Agent, or Firm* — Hugh P. Gortler

(57) ABSTRACT

Nondestructive inspection of a plurality of aircraft hat stiffeners includes exciting cavities of the stiffeners with electromagnetic radiation, and analyzing electromagnetic field responses of the cavities to detect state changes of the stiffeners.

17 Claims, 4 Drawing Sheets

U.S. PATENT DOCUMENTS

| | | | |
|---|---|---|---|
| 2007/0084290 A1* | 4/2007 | Fetzer et al. | 73/627 |
| 2007/0090294 A1* | 4/2007 | Safai et al. | 250/341.8 |
| 2007/0095140 A1* | 5/2007 | Kollgaard | 73/633 |
| 2007/0151375 A1* | 7/2007 | Kennedy et al. | 73/866.5 |
| 2008/0127756 A1* | 6/2008 | Horton et al. | 73/866 |
| 2009/0108211 A1* | 4/2009 | Bommer et al. | 250/395 |

OTHER PUBLICATIONS

U.S. Appl. No. 11/925,622, filed Oct. 26, 2007.

* cited by examiner

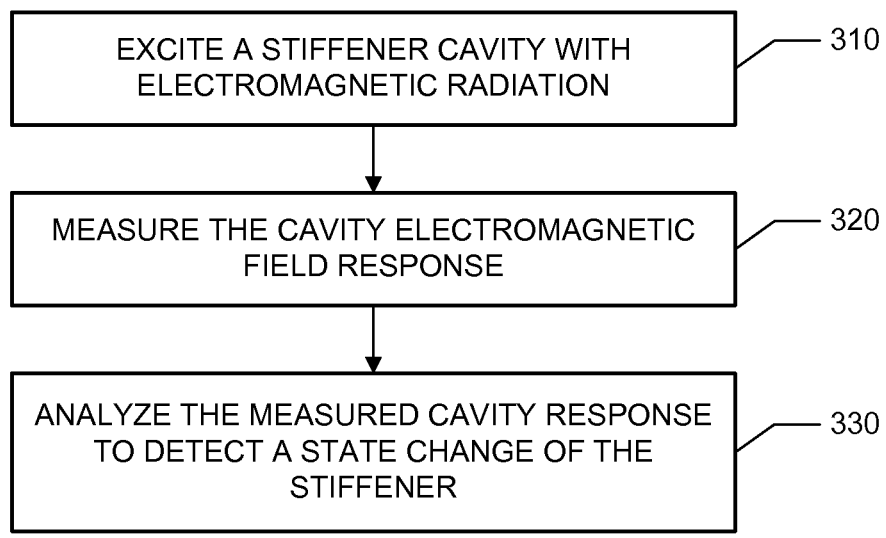

— Baseline (Healthy State)
◇◇◇ Simulated 4% Delamination
✦✦✦ Simulated 26% Delamination — empty cavity with filler
---- 0.2 grams of water
●●● 2.5 grams of water

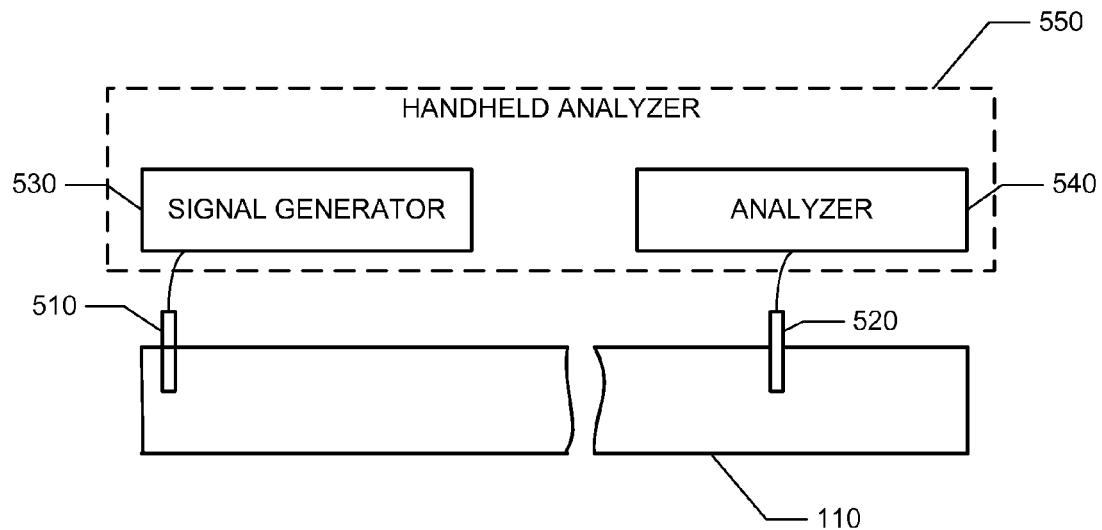
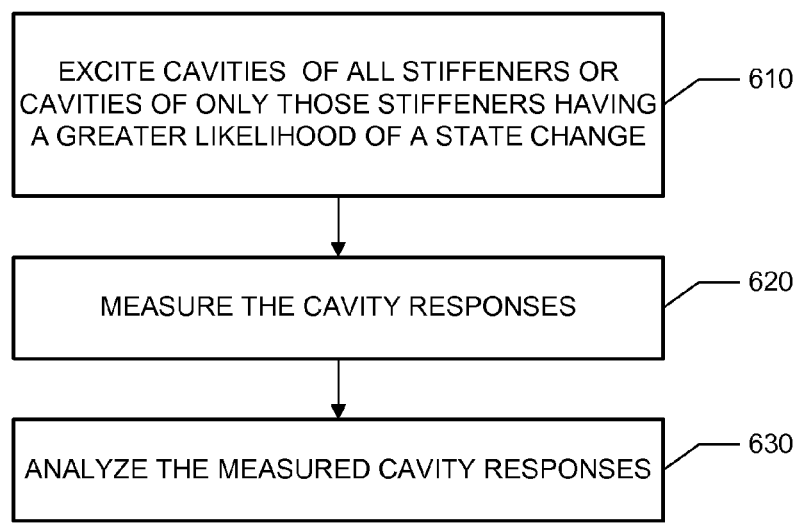

# NONDESTRUCTIVE INSPECTION OF AIRCRAFT STIFFENERS

BACKGROUND

Nondestructive inspection (NDI) of a structure involves thoroughly examining the structure without harming it or significantly disassembling it. Nondestructive inspection is commonly used in the aircraft industry to validate the health (e.g., integrity and fitness) of aircraft structures.

It would be desirable to perform NDI on composite fuselage stiffeners of new composite aircraft. If, for instance, a cargo vehicle bumps into a fuselage or some other impact to a fuselage occurs, information about the structural health of the fuselage stiffeners would be valuable. However, performing NDI such as ultrasonic testing on a large number of composite fuselage stiffeners would be time-consuming and costly.

SUMMARY

According to an embodiment of the present invention, nondestructive inspection of a plurality of aircraft stiffeners includes exciting cavities of the stiffeners with electromagnetic radiation, and analyzing electromagnetic field responses of the cavities to detect state changes of the stiffeners.

According to another embodiment, routine nondestructive inspection on hat stiffeners of an aircraft includes supplying an electromagnetic excitation to cavities of the hat stiffeners, and analyzing measured cavity responses of the hat stiffeners to detect any state changes of the hat stiffeners.

According to another embodiment, an aircraft includes a plurality of composite hat stiffeners. Each hat stiffener has a transmit antenna at one location for exciting its stiffener cavity with electromagnetic radiation. Each stiffener further has a receive antenna at another location of the stiffener for measuring its electromagnetic cavity response.

BRIEF DESCRIPTION OF THE DRAWINGS

FIG. 3 is an illustration of a method in accordance with an embodiment of the present invention.

FIG. 5 is an illustration of a system in accordance with an embodiment of the present invention.

FIG. 6 is an illustration of a method of performing a routine maintenance check of an aircraft.

DETAILED DESCRIPTION

Figure 1:
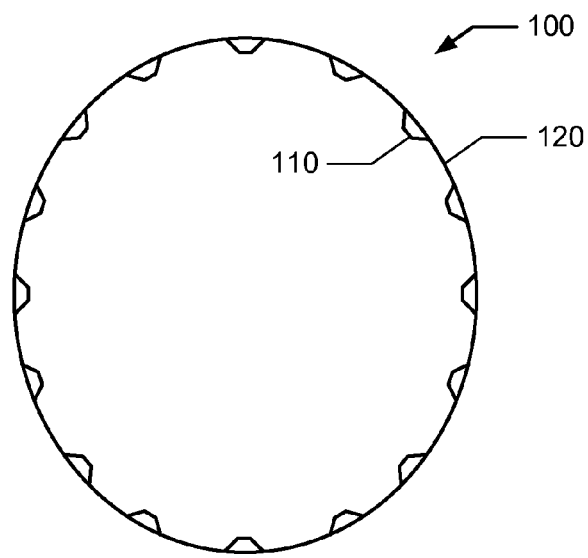
FIG. 1 is an illustration of a cross-section of an aircraft fuselage.

Reference is made to FIG. 1. A plurality of hat stiffeners 110 is disposed about a fuselage 100 of an aircraft. Some of the hat stiffeners 110 might extend over large segments of the fuselage 100. Other hat stiffeners 110 might terminate at apertures such as doors openings.

Figure 2:
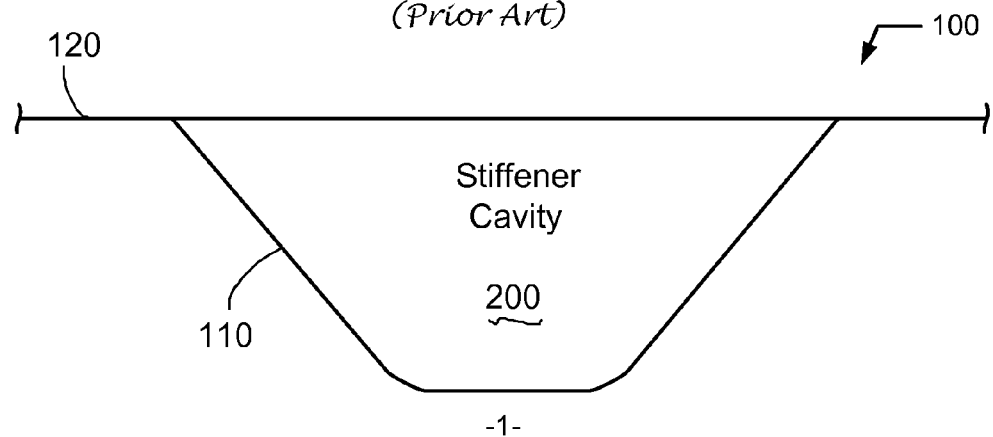
FIG. 2 is an illustration of a hat stiffener.

Additional reference is made to FIG. 2, which illustrates a cross section of a hat stiffener 110. A hat stiffener 110 as used herein refers to an open-sided structure that is affixed to the skin 120 of the fuselage 100 such that the hat stiffener 110 and the skin 120 form a cavity 200. The hat stiffener 110 increases the stiffness of the skin 120. The stiffener 110 and the skin 120 may be made of a composite such as carbon fiber reinforced plastic (CFRP), which is electrically conductive at RF frequencies. However, the hat stiffener 110 is not limited to any particular composition. The composition could include a metal such as aluminum, titanium, or alloys thereof.

The cavity 200 formed by the hat stiffener 110 and the skin 120 has electromagnetic properties. When the cavity 200 is excited with electromagnetic radiation, the cavity walls interact with the electromagnetic radiation, causing a distinct electromagnetic field response. This cavity response includes reflected, absorbed, and transmitted components of the electromagnetic radiation. The cavity 200 may exhibit characteristics of a waveguide or a cavity resonator. The electromagnetic radiation may be propagated from end-to-end of the cavity 200 as in an electromagnetic waveguide, or it may introduce a standing wave, such as with a cavity resonator. The RF characteristics are structure-specific (e.g., a function of geometry, surface conductivity, etc.).

Reference is now made to FIG. 3, which illustrates a method of performing non-destructive inspection of a hat stiffener. At block 310, the cavity formed by the hat stiffener and the skin is excited with electromagnetic radiation. This electromagnetic radiation will also be referred to as the "excitation." The frequency content of the excitation will be a function of cavity geometry, as well as locations of elements (e.g., antennas) that radiate the excitation and measure the cavity response in order to properly exploit the resonant characteristics of the cavity. In some embodiments, the frequency could be in the megahertz or gigahertz range. Continuous wave illumination (narrow band frequency) or pulsed illumination (broad band) may be used to create the excitation.

At block 320, the cavity electromagnetic response is measured. For instance, the cavity response is received by a receive antenna, and the received signal is sampled.

At block 330, the cavity response is analyzed to detect a state change of the hat stiffener. Certain state changes can cause a noticeable change in the field distribution throughout the cavity. That is, an electromagnetic field distribution corresponding to a healthy structure will be noticeably different than an electromagnetic field distribution corresponding to a structure whose state has changed. Such state changes include, without limitation, cracks, corrosion, changes in geometry (e.g., expansion, contraction, contortion and other deformation), delamination, disbanding, buckling, fiber break-out, penetration, fluid ingress (e.g., water, fuel), foreign object debris, etc. Thus, by analyzing the cavity response to the excitation, certain types of state changes of the structure can be revealed.

As an example, the measured cavity response is correlated to a state change of the structure. This may be done by comparing the measurements to baseline data, where the baseline data corresponds to a measurement taken on the same cavity at an earlier time or a different cavity that is representative of a healthy structure.

Figure 4A:
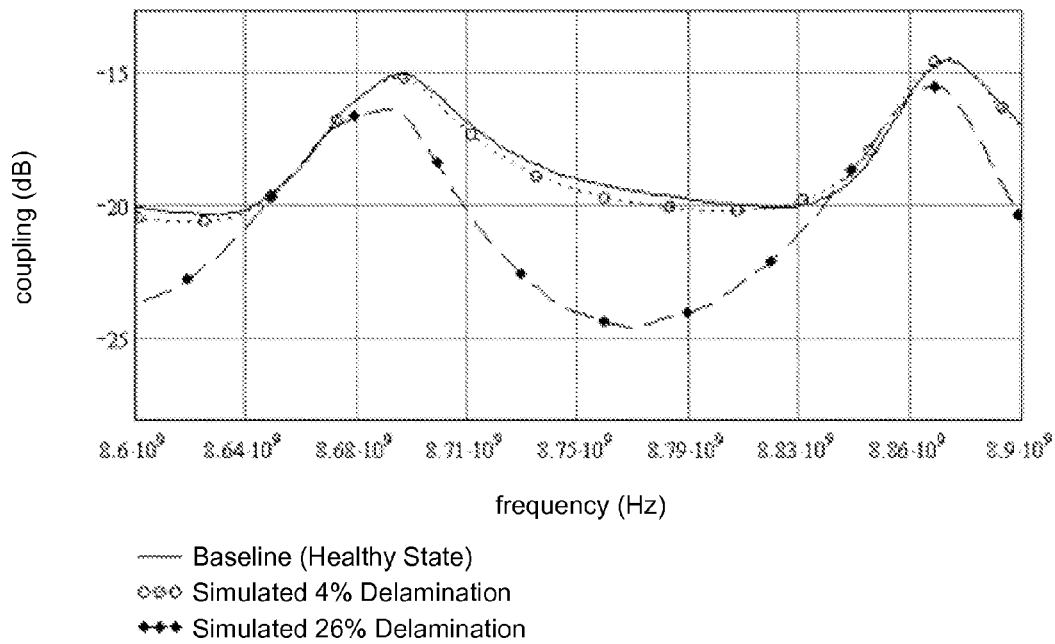
FIGS. 4a and 4b are illustrations of experimental test data for a portion of a hat stiffener.
Figure 4B:
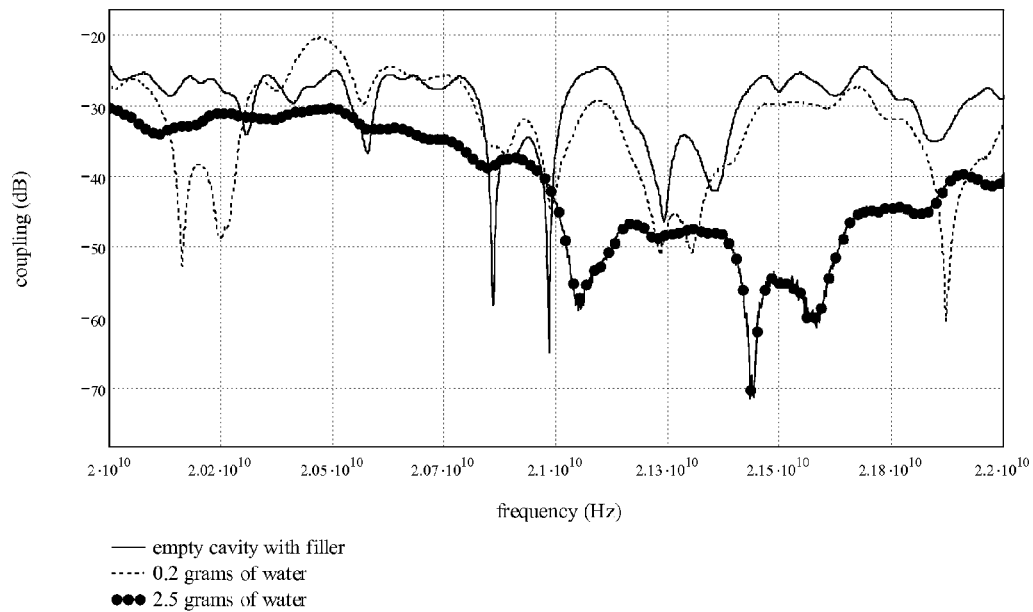

FIGS. 4a and 4b are illustrations of experimental test data (measured cavity responses) for a portion of a hat stiffener that was part of a test panel. The length of the hat stiffener is not important, but the test portion happened to be about three feet long (a stiffener can be as long as 100 feet). For each measurement, the test portion was excited at one end, and the cavity response was measured at the opposite end. The measured responses include different curves of coupling (a ratio of receive power to transmit power) versus frequency of the excitation.

Reference is now made to FIG. 4a, which illustrates test data for a healthy stiffener, a stiffener having a small delamination, and a stiffener having a major delamination. A first response was measured for a healthy hat stiffener, that is, a hat stiffener that is properly attached to the test panel. A first curve in FIG. 4a represented by a solid line corresponds to the healthy hat stiffener.

A second response was measured for a small delamination. To simulate the small delamination, the test portion was cut along 4% of its length (about 1.5"). The slice was about ¼" wide. A second curve represented by open circles was measured for this simulated small delamination. The change between the first and second curves is noticeable and is attributed to delamination.

A third response was measured for a major delamination. To simulate the major delamination, the cut in the test portion was lengthened to 26% of the stiffener's length. A third curve represented by the filled diamonds was measured for this simulated major delamination.

The change between the second and third curves is also noticeable. Thus, not only do the curves indicate a delamination, they also identify the degree of the delamination.

Reference is now made to FIG. 4b, which illustrates test data for a hat stiffener for varying degrees of moisture within the cavity. A first curve represented by a solid line was measured for a dry cavity, a second curve represented by a dashed line was measured for a cavity containing a small amount of water (0.2 grams), and a third curve represented by filled circles was measured for a cavity containing a larger amount of water (about 2.5 grams).

The change between the curves in FIG. 4b is noticeable. Thus, not only do the curves indicate moisture ingress, they can also identify the degree of the moisture ingress.

Moreover, curves such as those illustrated in FIG. 4a and FIG. 4b may be noticeably different from each other due to the nature of the state change. Different state changes can have different signatures. This allows the nature of the state change to be ascertained from the measured cavity responses.

As indicated above, a method according to an embodiment of the present invention is not limited to detecting delamination and fluid ingress. Other types of state changes can be detected, both in type and degree.

Reference is now made to FIG. 5, which illustrates different embodiments for exciting the cavity of a hat stiffener 110 and for analyzing the cavity response. In some embodiments, lightweight discrete transmit and receive antennas 510 and 520 may be permanently affixed to different locations of the stiffener 110. In other embodiments, removable antennas 510 and 520 may be used. The embodiments that follow are but a few examples of structures for applying the excitation to a cavity and measuring a cavity response.

In some embodiments, an antenna includes a conductor etched onto a circuit board. The circuit board may be surface mounted to a hat stiffener, embedded in a hat stiffener, etc.

In other embodiments, monopole antennas may be used. A monopole antenna may protrude through a small hole of the stiffener 110 and into the cavity 200. Monopole antennas may be used for both the transmit and receive antennas 510 and 520. In some instances, a monopole antenna might be permanently attached to the stiffener 110. In other instances, a technician might insert a monopole antenna through a hole in the stiffener 110 prior to testing, and withdraw the antenna from the hole after testing.

The transmit and receive antennas 510 and 520 are not limited to any particular locations along the hat stiffener. In some embodiments, transmit and receive antennas 510 and 520 may be at opposite ends of the stiffener 110. In other embodiments, the transmit antenna 510 may be at one end of the stiffener 110, and the receive antennae 520 may be only a few inches away.

A signal generator 530 feeds an excitation signal to the transmit antenna 510. The receive antenna 520 feeds the received signal to an analyzer 540.

Analysis of the cavity responses may be performed by a micro-processor-based device ("analyzer") 540 that is programmed with software and baseline data for analyzing the measured cavity responses to detect any state changes of the hat stiffeners. The baseline data may include measurements taken on the same cavity at an earlier time or on a different cavity that is representative of a healthy stiffener.

The signal generator 530 and the analyzer 540 may be onboard devices that are permanently wired to each stiffener of interest. All stiffeners could be excited at the same time, but the stiffeners would be individually addressed and their responses would be measured individually. Excitation of the stiffeners and measurement of the responses could be controlled automatically by part of a health management system onboard an aircraft, the responses could be compared to baseline data, and the results of the comparison could be sent to a panel in the cockpit or to a maintenance aid.

As shown in FIG. 5, the analyzer 540 may instead be integrated with the signal generator 530 in a single handheld device 550. Such a device 550 may communicate wirelessly with the transmit and receive antennas 510 and 520. Such a device 550 could be used by ground crew personnel to supply excitation to transmit antennas 510 of the hat stiffeners, sample responses measured by the receive antennas 520, and analyze the measured responses to detect state changes of the hat stiffeners 110.

Reference is made to FIG. 6, which illustrates a method of performing routine inspection of an aircraft. The method is described in connection with a ground crew mechanic who performs the inspection with a handheld device such as the device 550.

During a service inspection, a mechanic uses the handheld device to excite the stiffener cavities with electromagnetic radiation through transmit antennas (block 610) and to measure the cavity responses with the receive antennas (block 620). The handheld device analyzes the measured cavity responses (block 630). During analysis, the measured cavity responses may be compared to baseline data to identify any hat stiffeners having undergone state changes.

The inspection may be performed on all stiffeners in the fuselage, or the inspection may be performed only on those stiffeners having a greater likelihood of a state change. Stiffeners having a greater likelihood of delamination include those near cargo bay doors, aircraft doors, and the underbelly of the fuselage. Stiffeners having a greater likelihood of corrosion include those stiffeners underneath a lavatory or galley (fluids tend to drip down onto the joining elements of the structure).

An inspection method according to an embodiment of the present invention can be performed rapidly on hat stiffeners that are detached from the skin. Large lengths of a stiffener can be inspected very quickly. Damage to a stiffener can also be identified, even if the damaged stiffener is detached from the skin.

An inspection method according to an embodiment of the present invention can quickly detect conditions that lead to corrosion. Those conditions can be addressed before corrosion actually occurs.

An inspection method according to an embodiment of the present invention is not limited to hat stiffeners. Other types of stiffeners having cavities with electromagnetic properties could be inspected.

The invention claimed is:

1. A method comprising performing nondestructive inspection of a plurality of stiffeners in an aircraft, the nondestructive inspection including exciting cavities of the stiffeners with electromagnetic radiation; and analyzing electromagnetic field responses of the cavities to detect at least one of foreign object debris and fluid ingress.

2. The method of claim 1, wherein exciting each cavity includes supplying excitation at one location of each stiffener; and wherein the analyzing each cavity includes measuring the cavity response at another location of each stiffener.

3. The method of claim 2, wherein each stiffener is excited to exhibit characteristics of an electromagnetic waveguide.

4. The method of claim 2, wherein each stiffener is excited to exhibit characteristics of a cavity resonator.

5. The method of claim 1, wherein detecting a state change includes measuring a cavity response and comparing the measured response to baseline data.

6. The method of claim 1, wherein the stiffeners are inspected for delamination.

7. The method of claim 1, wherein the stiffeners are inspected for fluid ingress.

8. The method of claim 1, wherein the nondestructive inspection is performed only on those stiffeners having a greater likelihood of a state change.

9. The method of claim 8, wherein those stiffeners having a greater likelihood of a state change include stiffeners below galleys and lavatories of the aircraft.

10. The method of claim 1, wherein a handheld device is used to supply excitation to the cavities and also to analyze the cavity responses.

11. The method of claim 1, wherein the stiffeners are inspected for foreign object debris.

12. The method of claim 1, wherein analyzing the electromagnetic field response of a cavity includes detecting a change in the field distribution throughout the cavity.

13. A method comprising performing nondestructive inspection on hat stiffeners in an aircraft during routine service inspection of the aircraft, the nondestructive inspection including exciting cavities of the stiffeners with electromagnetic radiation; and analyzing electromagnetic field responses of the cavities to detect state changes.

14. The method of claim 13, wherein the electromagnetic excitation is supplied only to those hat stiffeners having a greater likelihood of a state change.

15. The method of claim 14, further comprising supplying an electromagnetic excitation to other structures having cavities with electromagnetic properties; and measuring the cavity responses of the other structures to detect state changes of the other structures.

16. The method of claim 13, wherein a handheld device is used to supply excitation to the cavities and also to analyze the cavity responses.

17. A method comprising performing nondestructive inspection of a plurality of stiffeners in an aircraft, the nondestructive inspection including exciting cavities of the stiffeners with electromagnetic radiation; and analyzing electromagnetic field responses of the cavities, wherein the nondestructive inspection is performed only on those stiffeners having a greater likelihood of a state change, including stiffeners around cargo bay doors of the aircraft.

* * * * *